Figure 1:
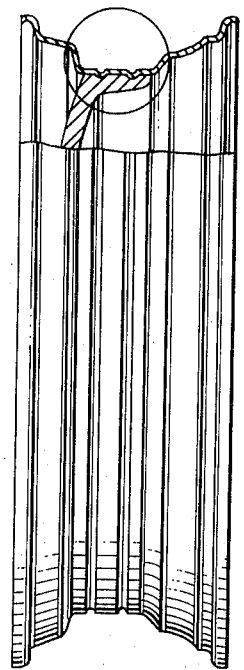
Figure 1:
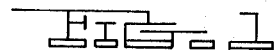

United States Patent [19]

Nasson

[11] 3,859,704
[45] Jan. 14, 1975

[54] WHEEL MANUFACTURE
[75] Inventor: Carl Nasson, Detroit, Mich.
[73] Assignee: Ford Motor Company, Dearborn, Mich.
[22] Filed: July 3, 1969
[21] Appl. No.: 838,915

[52] U.S. Cl............... 29/159.01, 29/458, 29/516, 156/198, 156/221, 301/63 R
[51] Int. Cl............................ B21h 1/02, B21k 1/32
[58] Field of Search............ 29/159.1, 159.01, 458, 29/516; 156/196, 198, 221; 301/63, 65

[56] References Cited
UNITED STATES PATENTS
| | | | |
|---|---|---|---|
| 1,688,146 | 10/1928 | Klaus | 29/159.1 |
| 2,992,857 | 7/1961 | Lemmerz | 29/159.1 X |
| 3,302,273 | 2/1967 | Benton et al. | 29/159 |
| 3,343,252 | 9/1967 | Reesor | 29/516 X |

Primary Examiner—C. W. Lanham
Assistant Examiner—Victor A. Di Palma
Attorney, Agent, or Firm—William E. Johnson; Keith L. Zerschling

[57] ABSTRACT

This disclosure relates to a process for the production of vehicular wheels and finds particular utility in wheels in which a steel rim must be united to a magnesium or aluminum spider. The aluminum or magnesium spider is united to the steel rim by a combination of adhesive action and metal interlocking since steel is essentially unweldable to either aluminum or magnesium.

5 Claims, 2 Drawing Figures

PATENTED JAN 14 1975  3,859,704

INVENTOR
CARL NASSON
BY John R. Faulkner
Thomas H. Oster
ATTORNEYS

WHEEL MANUFACTURE

PRIOR PRACTICE

Automotive vehicle wheels have long been manufactured by riveting a steel spider to a steel rim. This process gave a dependable joint and one which was readily subject to visual inspection. An absolutely dependable joint between the spider and the wheel rim is required since failure of this joint during operation of the vehicle would be hazardous to the life of the operator and passengers.

With the advent of the tubeless tire, these riveted joints were required not only to be mechanically dependable, but to be completely pneumatically sealed. The absence of such a complete pneumatic seal results in a slow leak and deflation of the tire.

At this juncture in time more sophisticated spot welding equipment was developed for dependably joining steel members. This improved spot welding equipment has essentially displaced rivets as the fastening means between wheel spiders and wheel rims. This change, of course, eliminated tire deflation due to leaks past defective rivets.

THIS CONTRIBUTION TO THE ART

Vehicular wheels for special uses have been constructed more recently from steel wheel rims and from wheel spiders constructed from alloys which are basically either aluminum or magnesium. These light metals have a definite appeal both from the aesthetic and functional standpoints. They are particularly desired from a utilitarian view because of a substantial reduction in unsprung weight.

Magnesium or aluminum as a wheel spider material has the inherent disadvantage from a manufacturing standpoint of being quite unweldable to the steel wheel rims which are in universal use. This has caused the art to revert to the previously discarded riveting process with the attendant difficulties compounded by the inherent softness and ductility of magnesium and aluminum.

Figure 2:
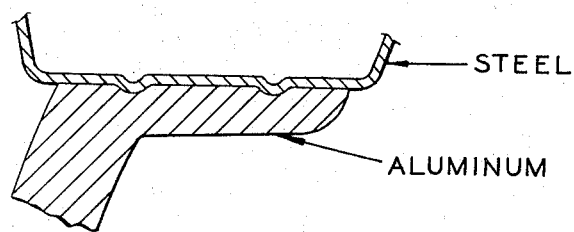
Figure 2:
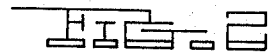

These difficulties led to this invention which will be explained in conjunction with:

FIG. 1 which is an elevational view partially in section of a vehicular wheel constructed in accordance with this invention; and FIG. 2 is an enlarged sectional view of the circled portion of FIG. 1.

The aluminum or magnesium wheel spider and the steel wheel rim which are assembled according to this invention are held securely together by means of a curable resin adhesive and a mechanical interlock produced between the steel wheel rim and the magnesium or aluminum wheel spider. These two securing mechanisms may be augmented by making the fit between the wheel rim and the wheel spider an interference fit so that the wheel rim must be forced over the wheel spider. The term "interference fit" is defined in *Machinery Handbook*, 17th Edition at page 1347 as "one having limits of size so specified that an interference always results when mating parts are assembled." It is to be understood that this definition applies to the language of this invention with the provision that the use of temperature differentials does not remove the joint from the scope of the definition. The invention includes the use of fits described on page 1349 of the *Machinery Handbook* as LN (Locational Interference Fit) and FN (Force or Shrink Fit).

The art of assembling metal objects by means of curable resinous adhesives is well developed and will not be further described other than to refer to a very lucid description of the process presented in the April, 1954 issue of *Machine Design* at pages 1 to 32.

An inspection of both FIG. 1 and FIG. 2 of the drawings will show that the steel wheel rim has been interlocked with the magnesium or aluminum wheel spider to reinforce the adhesive joint. This interlocking joint is peripheral in location. The exact mechanism by which this interlock occurs is not critical. It is probably best formed by providing peripheral grooves in the magnesium or aluminum wheel spider, forcing the wheel rim over the spider and then deforming the steel of the wheel rim into the already existing grooves in the aluminum or magnesium spider. It is to be understood that a suitable quantity of curable resinous adhesive is applied either to the steel wheel rim or to the aluminum or magnesium wheel spider, or both before the steel wheel rim is applied to the aluminum or magnesium spider. The steel of the steel wheel spider can then easily be deformed into the grooves in the aluminum or magnesium wheel spider by rotating the wheel under a suitable roll and applying a heavy concentrated radial load to the steel wheel rim locally over the grooves in the spider during rotation.

An improved joint can be obtained by making the joint between the steel wheel rim and the aluminum or magnesium wheel spider an interference fit. This fit will necessarily somewhat deform the steel rim and should be sufficiently light to produce insignificant deformation. This type of interference fit enhances rather than injures the strength of the adhesive joint between the steel wheel rim and the aluminum or magnesium wheel spider.

Further assurance of adequate distribution of the curable resinous adhesive over the surfaces involved is secured by rolling the wheel rim into the grooves of the wheel spider while the resinous adhesive is still in a flowable condition. The steel of the wheel rim flows into the grooves of the magnesium or aluminum wheel spider and hydraulically forces the flowable resinous adhesive in an axial direction away from the grooves. The resin is then cured either by the passage of time or by gently heating.

This invention has been illustrated and described as having two grooves interlocking the wheel rim and wheel spider. The invention is not so limited, but any desired number of grooves may be employed.

I claim as my invention:

1. The process of producing a vehicular wheel comprising providing a wheel rim and a wheel spider adapted to be inserted into and attached to the wheel rim, the interior of said wheel rim being a surface of revolution, the portions of said wheel spider to be attached to the wheel rim being also surfaces of revolution and dimensionally complementary to the wheel rim, the clearance between the wheel rim and the complementary portions of the wheel spider being no greater than can be spanned effectively by a resinous adhesive, applying a resinous adhesive to either the wheel rim or wheel spider on the surfaces to be joined, inserting the wheel spider into the steel rim, forcing the wheel rim into peripheral mechanical interlocking engagement with the wheel spider and permitting the resinous adhesive to cure.

2. The process recited in claim 1 in which the wheel spider is provided with at least one peripheral groove prior to its insertion into the wheel rim, and the wheel rim is deformed to at least partially fill said grooves and rigidly mechanically secure the wheel rim to the wheel spider.

3. The process of claim 2 in which at least a portion of the resinous adhesive is placed in the peripheral grooves whereby it is positively forced between the wheel rim and wheel spider when the wheel rim is deformed into the wheel spider.

4. The process of claim 1 in which an interference fit is provided between the exterior of the wheel spider and the complementary surface of the wheel rim.

5. The process recited in claim 1 in which the wheel spider is constructed of aluminum or magnesium.

* * * * *